United States Patent
Soderquist

(12) 
(10) Patent No.: US 6,325,407 B1
(45) Date of Patent: Dec. 4, 2001

(54) AIRBAG MODULE COVER ATTACHMENT

(75) Inventor: Quin Soderquist, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/420,029

(22) Filed: Oct. 18, 1999

(51) Int. Cl.[7] .................................................. B60R 21/16
(52) U.S. Cl. ............................... 280/728.2; 280/728.3; 280/731
(58) Field of Search ...................... 280/720.2, 728.3, 280/731

(56) References Cited

U.S. PATENT DOCUMENTS

| | | | |
|---|---|---|---|
| 5,201,541 | * | 4/1993 | Jones et al. .................. 280/731 |
| 5,303,951 | | 4/1994 | Goestenkors et al. ........ 280/728.3 |
| 5,348,339 | | 9/1994 | Turner ........................... 280/728.3 |
| 5,354,093 | | 10/1994 | Schenck et al. .............. 280/728.2 |
| 5,445,409 | | 8/1995 | Abramczyk et al. ......... 280/728.2 |
| 5,538,277 | | 7/1996 | Frary et al. ................... 280/728.2 |
| 5,580,082 | * | 12/1996 | Shiga et al. .................. 280/728.3 |
| 5,588,669 | | 12/1996 | Leonard et al. .............. 280/728.3 |
| 5,678,850 | | 10/1997 | Ricks et al. .................. 280/728.2 |
| 5,685,557 | | 11/1997 | Persson et al. ............... 280/728.2 |
| 5,709,401 | * | 1/1998 | Schenck ....................... 280/728.2 |
| 5,709,402 | | 1/1998 | Leonard ....................... 280/728.2 |
| 5,738,369 | | 4/1998 | Durrani ........................ 280/731 |
| 5,791,682 | | 8/1998 | Hiramitsu et al. ........... 280/728.2 |
| 5,829,777 | | 11/1998 | Sakurai et al. ............... 280/728.2 |
| 5,833,262 | | 11/1998 | Fujita et al. .................. 280/728.2 |

FOREIGN PATENT DOCUMENTS

| | | |
|---|---|---|
| 196 14 276 C1 | 8/1997 | (DE). |
| 703 122 A1 | 3/1996 | (EP). |
| 2 270 882 | 5/1996 | (GB). |
| 2 339 408 | 1/2000 | (GB) ............ B60R/21/20 |

* cited by examiner

*Primary Examiner*—Kenneth R. Rice
(74) *Attorney, Agent, or Firm*—Sally J. Brown

(57) ABSTRACT

An arrangement is provided for attaching a cover to a housing member of an airbag module assembly, wherein an inflatable airbag cushion is stored. The housing member includes a plurality of mounting projections, each of the mounting projections having an inward directed free end. The cover includes a plurality of mounting openings each receiving an associated one of the mounting projections with the free end of each of the mounting projections extending in a direction away from the stored inflatable airbag cushion.

20 Claims, 13 Drawing Sheets

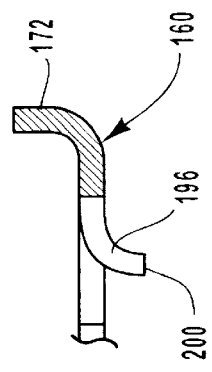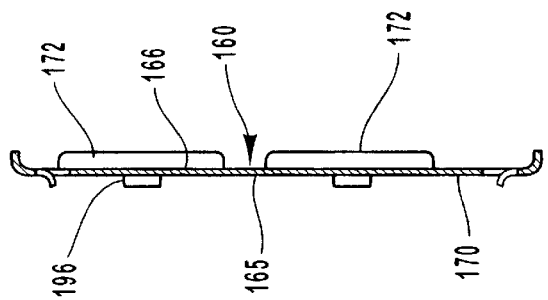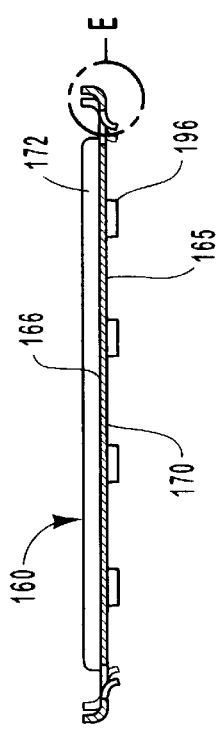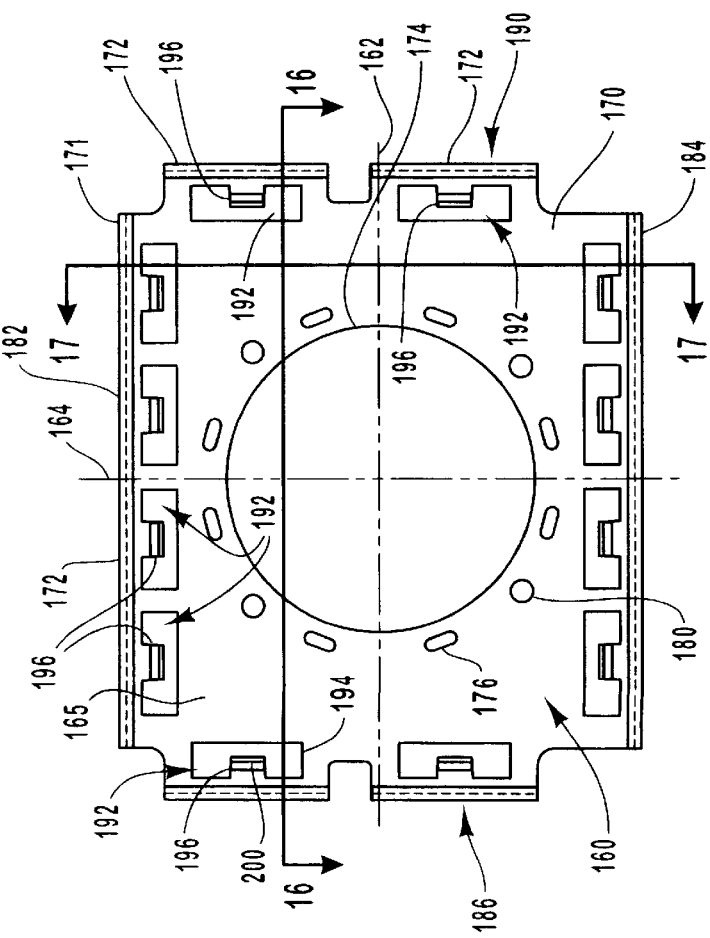

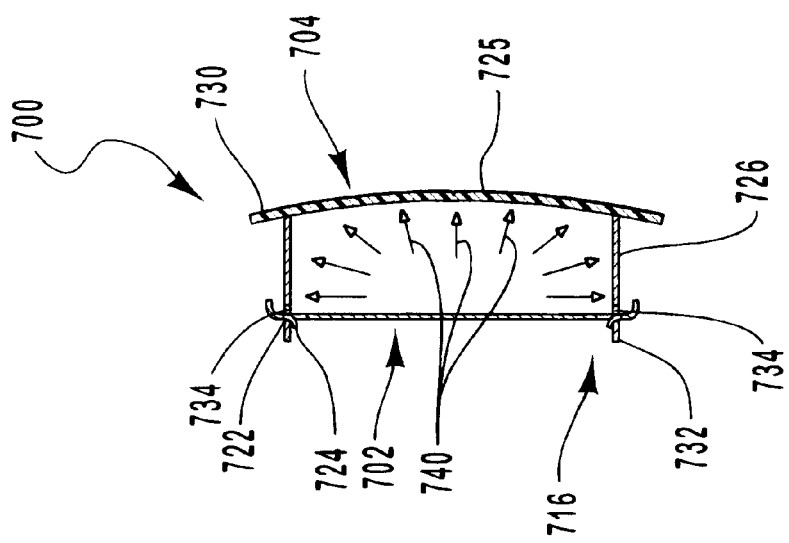
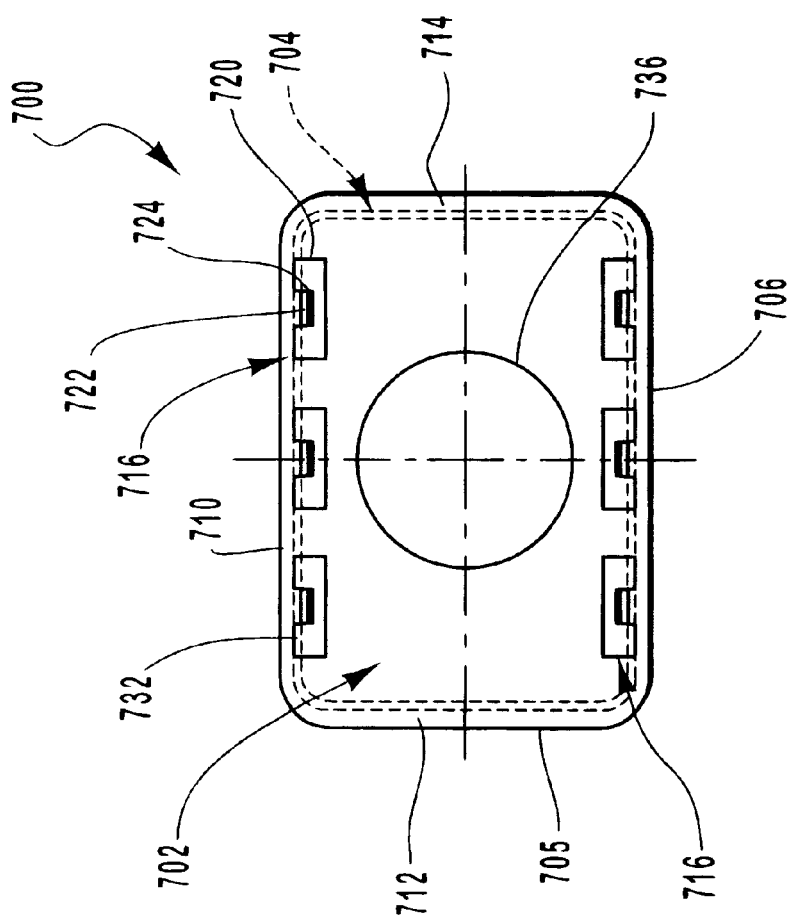

AIRBAG MODULE COVER ATTACHMENT

BACKGROUND OF THE INVENTION

This invention relates generally to inflatable passive restraint systems for use in vehicles for restraining the movement of a seated occupant such as in the event of a collision. More particularly, the invention relates to an improved attachment arrangement for securing a decorative cover to or within an inflatable occupant restraint airbag module assembly.

It is well known to protect a vehicle occupant by means of safety restraint systems which self-actuate from an undeployed to a deployed state without the need for intervention by the operator, i.e., "passive restraint systems." Such systems are commonly composed of one or more module assemblies mounted within the passenger compartment of a vehicle. Typical module assemblies used in such systems contain or include an inflatable vehicle occupant restraint, such as in the form of a cushion or bag, commonly referred to as an "airbag cushion." In practice, airbag cushions are normally housed in an uninflated and folded condition to reduce or minimize space requirements. Typically, upon actuation of the system, such as when the vehicle encounters a sudden deceleration as in the event of a collision, an associated airbag cushion is designed to inflate or expand in a matter of no more than a few milliseconds with an inflation fluid, e.g., a gas, produced or supplied by a device commonly referred to as an "inflator." In practice, such an airbag cushion is desirably deployed into a location within the vehicle between the occupant and certain parts of the vehicle interior, such as a door, steering wheel, instrument panel or the like, to prevent or avoid the occupant from forcibly striking such part(s) of the vehicle interior.

In such module assemblies, it is common for the airbag cushion and, at least a portion, of the associated inflator device to be stowed or contained within a module housing such as composed, at least in part, by a housing member such as in the form of a reaction plate or other appropriately selected shape or form. Such housing member components typically have joined or connected therewith an associated or corresponding cover member or element. As will be appreciated, the inclusion of such a cover member can be desirable in various respects. For example, such a cover member may desirably serve to enclose various of the respective module assembly components such as to prevent damage thereto, such as damage to the airbag cushion. Further, it has become common to provide for the inclusion of such a cover member as a decorative feature such as forms a part of the dashboard, steering wheel, seat, door, roof, etc. of the vehicle. Such cover members typically include a frangible section, such as having tear lines of reduced strength such as to permit one or more sections of the cover member to move upon system actuation such as to permit the associated airbag cushion to expand past the cover upon inflation. In practice, the frangible section of such cover members must be sufficiently strong to resist accidental opening prior to proper actuation of the restraint system. Consequently, the frangible sections of such cover members generally require the proper application of a relatively large force onto the cover, such as by the inflating airbag cushion, before the frangible section releases and permits the airbag cushion to deploy therethrough.

The application of such large forces may, however, create a risk that the cover or at least a portion thereof may undesirably become dislodged or unattached from the associated housing member. In order to reduce, minimize or eliminate the risk of such dislodgement or detachment, a need and a demand has existed for a cover attachment arrangement wherein the cover is securely attached to or with the module housing. Unfortunately, the need for strength in the connection between an associated cover and housing has often resulted in more complicated than desired connection schemes. For example, in order to ensure proper cover attachment and retention, common cover and housing connection schemes have incorporated or relied on the inclusion of one or more of the following features:

1) various secondary components, such as rivets or other fasteners or the like;
  2) various secondary operations, such as crimping or the like; and
  3) relatively intricate or complicated shapes or forms.

Unfortunately, the inclusion of such features typically undesirably increases the costs associated with the connection scheme. Further, the inclusion of such features typically undesirably complicates or makes more expensive the rework of such installations. For example, the rework of such designs is typically laborious and may require scrapping of one or more components involved in the rework.

The problem of complicated connection between a cover and associated housing is at least in part addressed by commonly assigned U.S. Pat. No. 5,588,669, issued Dec. 31, 1996, to Leonard et al., the disclosure of which patent is incorporated herein in its entirety. This patent discloses a hook and window airbag cover attachment arrangement wherein the housing includes a side wall which forms a series of outwardly extending mounting tabs or hooks and the cover includes a series of windows or slots which mate with the outwardly extending hooks.

FIGS. 1 and 2 illustrate a simplified module assembly, designated by the reference numeral 50, utilizing one such common cover and housing connection. More particularly, FIG. 1 is a fragmentary bottom view of the module assembly 50 of complimentary sized and shaped reaction housing 52 and cover 54. As shown, the reaction housing 52 is generally rectangular in shape, with opposed first and second longitudinal sides 56 and 60 and opposed first and second lateral sides 62 and 64. The reaction housing 52 includes outwardly extending tabs or hooks 66 on the first and second longitudinal sides 56 and 60, respectively. As shown in FIG. 2, the cover 54 includes a main panel 70 and a skirt 72 extending therefrom. The cover main panel 70 forms or includes a brim 73, exterior to the skirt 72. Note that the view shown in FIG. 1 is fragmentary in nature as, for example, the cover brim 73 has not there been shown in an effort to facilitate illustration and comprehension. While various forms of covers may be used, the cover 54 is of the form or type commonly referred to as a "clamshell cover" in that such cover normally or commonly forms two separate complementary cover pieces upon opening. The skirt 72 includes a series of windows or slots 74 which mate with the outwardly extending hooks 66 of the reaction housing 52.

While FIG. 1 shows the inclusion of a circular opening 76 in the reaction housing 52 for the placement of an associated inflator device and FIG. 2 includes airbag cushion deployment direction arrows 80 to illustrate the typical deployment directions which an associated airbag cushion will deploy and exert forces onto the assembly, FIGS. 1 and 2 have been simplified by not showing the associated inflator, airbag cushion and associated connection or retention devices or features.

FIGS. 3 and 4 illustrate the module assembly 50 upon actuation and deployment of the associated airbag cushion 82 (shown in FIG. 4 and which FIG. 4 also includes direction arrows 83 illustrating typical or usual direction inflation medium forces upon the airbag cushion 82). As shown in FIGS. 3 and 4, and in accordance with typical such assemblies, upon actuation of the module assembly 50, the airbag cushion 82 acts against the cover 54 such as results in the tearing or otherwise opening of the cover such as to form first and second cover pieces, 84 and 86, respectively, and to permit the airbag cushion 82 to deploy into desired position. Upon such deployment, the outwardly extending housing hooks 66 interact with the cover windows 74 to normally retain the first and second cover pieces 84 and 86 joined to the housing 52 upon deployment.

While the attachment arrangement of U.S. Pat. No. 5,588,669 and such as illustrated in FIGS. 1–4 has generally been successful in overcoming at least some of the problems and shortcomings associated with at least certain of the prior art cover and housing attachment arrangements, further improvements are desired.

For example, as shown in FIGS. 5 and 6, upon the further development of the deployment of the module assembly 50, the deployed airbag cushion 82 may push or rebound against the respective cover 54 (or the pieces 84 and 86 thereof, such as in the event of a clamshell cover), as signified by the arrows 90 in FIG. 6. As a result of the so directed forces, the cover 54 or one or more elements thereof such as the cover pieces 84 and 86 may become dislodged or disengaged from the housing 52, as the outwardly extending housing hooks 66 and the cover windows 74 no longer interact in connecting fashion.

While such a dislodged or disengaged cover element may normally be retained by the restraint system and the occurrence of such dislodgement or disengagement typically does not adversely effect deployment, attachment schemes which avoid such occurrences have been desired.

Thus, there is a need and a demand for an improved airbag module cover attachment arrangement such as may more readily and easily permit or provide positive cover attachment throughout the deployment process (i.e., both during and following deployment including, for example, upon cushion rebound) and do so in a relatively simple, effective and efficient manner. In particular, there is a need and a demand for an improved airbag module cover attachment arrangement which more readily and easily permits or provides positive cover attachment throughout the deployment process without incorporating or relying on the inclusion of one or more of the following features:

1) secondary components, such as rivets or other fasteners or the like;
2) secondary operations, such as crimping or the like; and
3) relatively intricate or complicated shapes or forms.

Further, in addition to improved attachment arrangements for conventional covers, there is a need and a demand for an improved airbag module cover attachment arrangement such as may more readily permit or facilitate the use of those cover elements designed to tear or otherwise form two or more separate parts upon the occurrence of a deployment event. In particular, there is a need and a demand for an improved such airbag module cover attachment arrangement of simple design and operation wherein each such cover element part is individually retained or remains attached with or to the respective housing even in the event of such cushion rebound.

SUMMARY OF THE INVENTION

A general object of the invention is to provide an improved attachment arrangement for securing a decorative cover or the like to or within an inflatable occupant restraint airbag module assembly.

A more specific objective of the invention is to overcome one or more of the problems described above.

The general object of the invention can be attained, at least in part, through an arrangement for attaching a cover with a housing member in an airbag module assembly wherein the cover and the housing member cooperate to define a storage volume for at least in part housing a stored inflatable airbag cushion. In accordance with one embodiment of the invention, the housing member of such an arrangement includes a plurality of first mounting projections, each having an inward directed free end. The cover includes a plurality of first mounting openings each receiving an associated one of the first mounting projections. In such an attachment arrangement, the free end of each of the first mounting projections extends in a direction away from the stored inflatable airbag cushion.

The prior art generally fails to provide an arrangement for attaching a cover with a housing member in an airbag module assembly which arrangement is as simple as desired and which provides or results in positive cover retention by the housing member or in the module assembly throughout the deployment process. In particular, the prior art generally fails to provide a positive cover retention attachment arrangement throughout the deployment process without requiring the addition, inclusion or use of one or more of the following features:

1) various secondary components, such as rivets or other fasteners or the like;
2) various secondary operations, such as crimping or the like; and
3) relatively intricate or complicated shapes or forms.

In accordance with an alternative embodiment of the invention, the invention further comprehends a cover attachment arrangement for an airbag module which includes a housing member and a cover cooperating therewith to define a chamber adapted to at least in part house an inflatable airbag cushion. The housing member is constructed and arranged to be secured to a structural element of a vehicle. The housing member includes a plurality of receiving holes. Each of the receiving holes includes at least one first mounting projection having an inward directed free end. The cover includes a main panel, a skirt extending from the main panel, and a plurality of first tabs extending from the skirt. Each of the tabs is adapted to be received in at least one of the housing member receiving holes. At least one of the first tabs includes at least one mounting opening adapted to receive an associated one of the first mounting projections. At least one of the first tabs includes a lead edge adapted for press-on assembly relative to the housing member. At least one of the first tabs includes at least one support rib. The cover additionally includes at least one locator finger extending into the at least one mounting opening of the at least one of the first tabs. The locator finger is adapted to cooperate with the associated one of the first mounting projections to restrict movement thereof within the at least one mounting opening. In such arrangement, the free end of each of the first mounting projections extends in a direction away from the chamber.

Other objects and advantages will be apparent to those skilled in the art from the following detailed description taken in conjunction with the appended claims and drawings.

BRIEF DESCRIPTION OF THE DRAWINGS

FIG. 15 is a bottom plan view of a housing member reaction plate in accordance with an alternative embodiment of the invention.

FIG. 16 is a sectional view of the housing member reaction plate shown in FIG. 15, taken substantially along the line 16—16 of FIG. 15 and viewed in the direction of the arrows.

FIG. 17 is a sectional view of the housing member reaction plate shown in FIG. 15, taken substantially along the line 17—17 of FIG. 16 and viewed in the direction of the arrows.

FIG. 18 is an enlarged detail view of the housing member reaction plate shown in FIG. 16 encircled within the circle E.

FIG. 19 is an exploded side view of the cover and the housing member of airbag module assembly of FIGS. 7–11, while

FIG. 23 is an exploded side view of a cover and a housing member of an airbag module assembly in accordance with another preferred embodiment of the invention, while

FIGS. 30 and 31 are, similar to FIGS. 1 and 2, simplified fragmentary bottom and side views, respectively, of an airbag module assembly wherein the respective cover and housing members are attached in accordance with one embodiment of the invention.

DETAILED DESCRIPTION OF THE INVENTION

Figure 2:
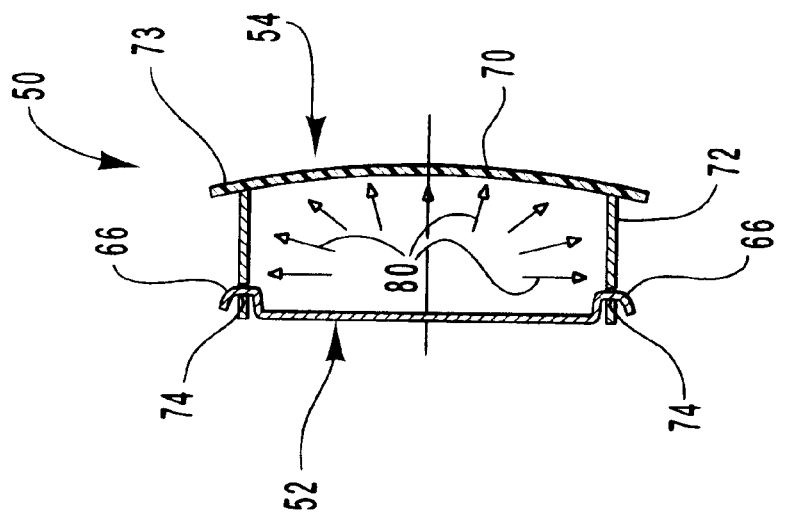
FIGS. 1 and 2 are simplified fragmentary bottom and side views, respectively, of an airbag module assembly having a cover and a housing member attached in an arrangement typical of the prior art, in an at rest state.
Figure 1:
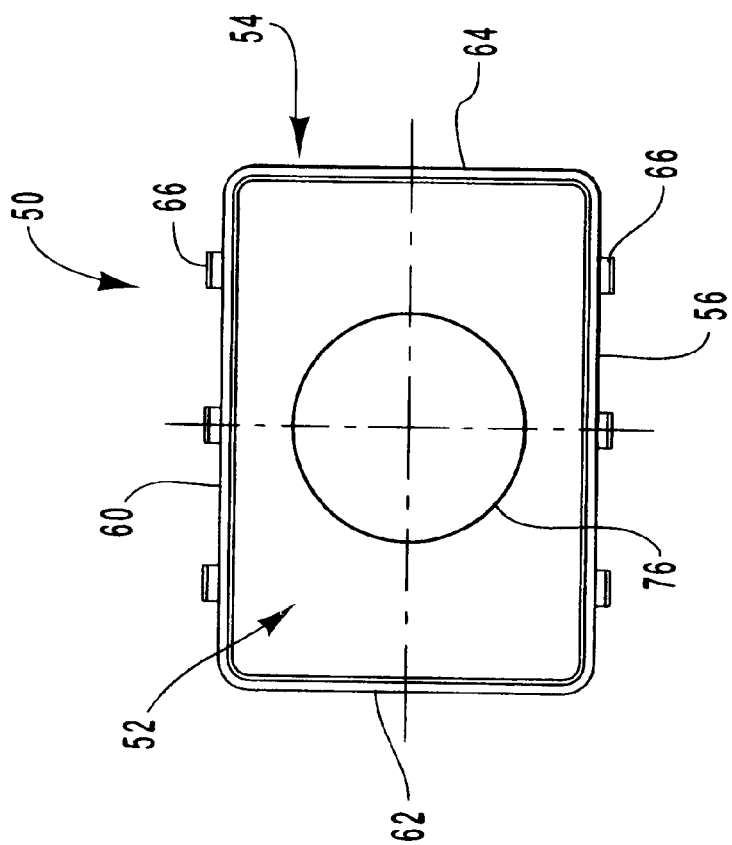
Figure 4:
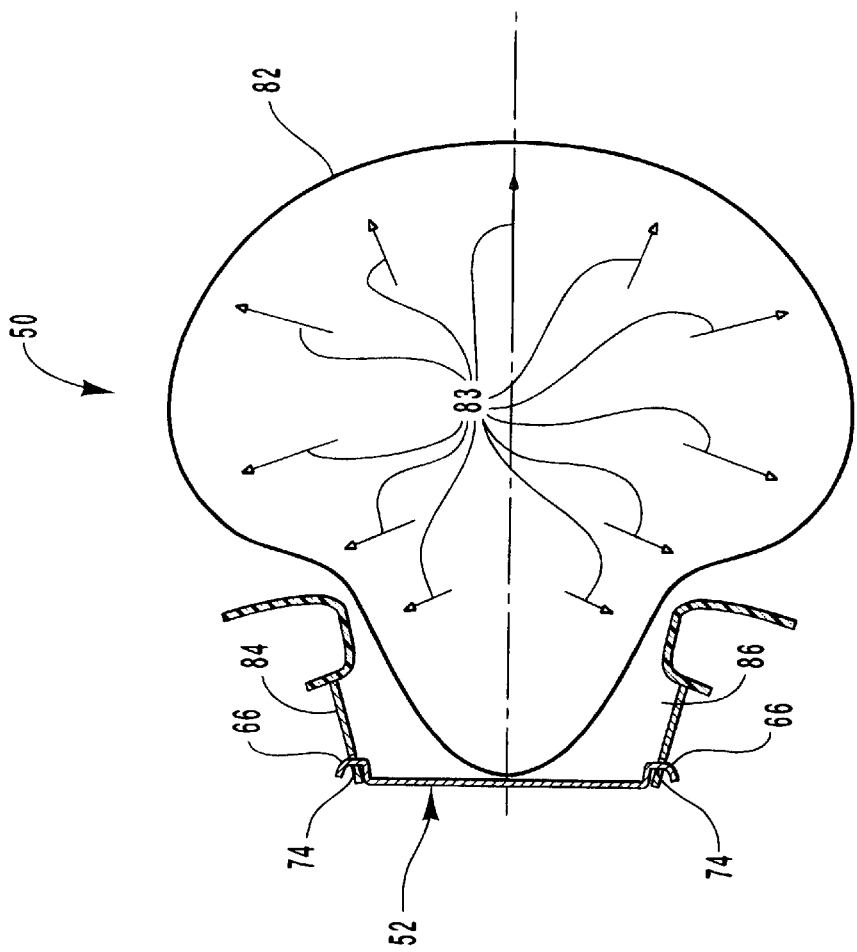
FIGS. 3 and 4 are simplified fragmentary bottom and side views, respectively, of the prior art airbag module assembly shown in FIGS. 1 and 2 but now upon actuation with the associated airbag cushion being deployed therefrom.
Figure 3:
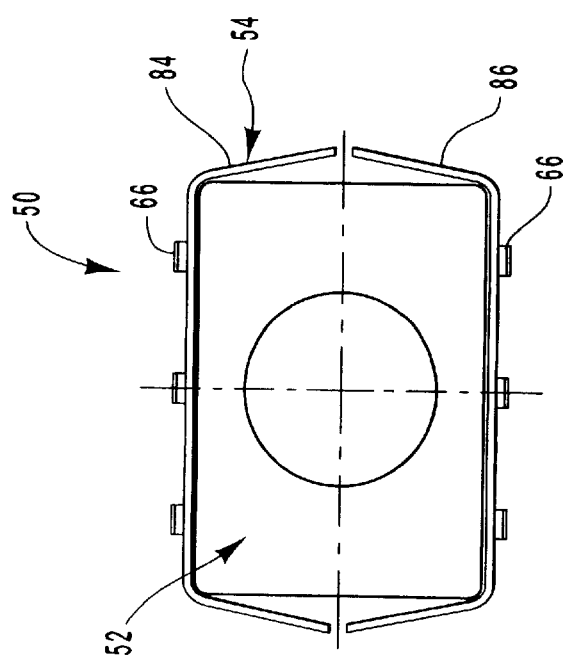
Figure 6:
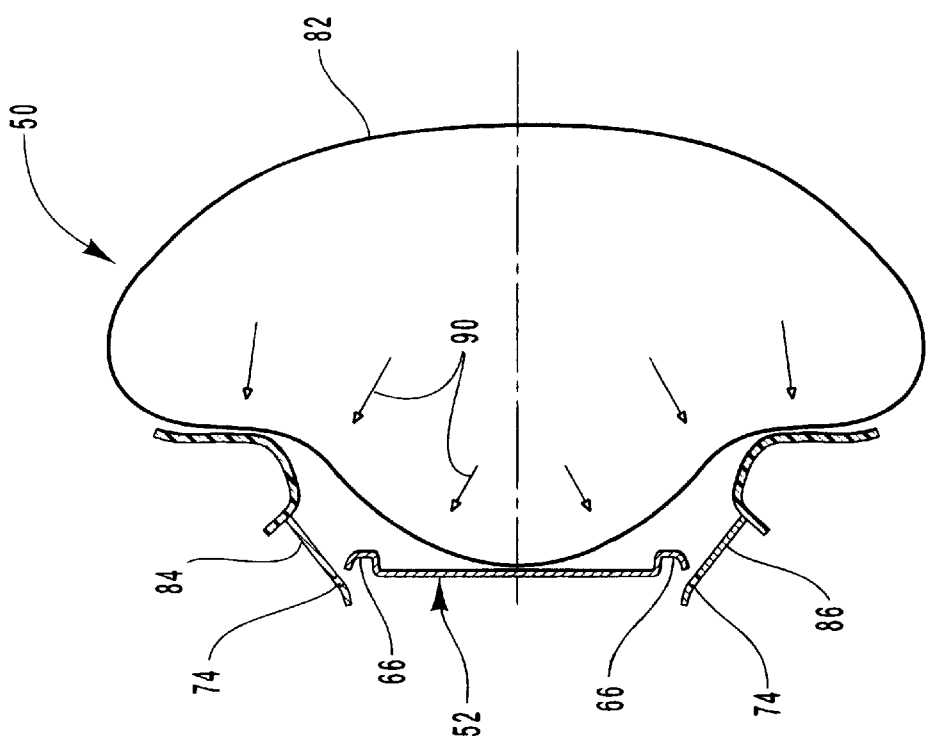
FIGS. 5 and 6 are simplified fragmentary bottom and side views, respectively, of the prior art airbag module assembly shown in FIGS. 3 and 4 but now at a later time subsequent to actuation and showing the airbag cushion rebounding against the housing member.
Figure 5:
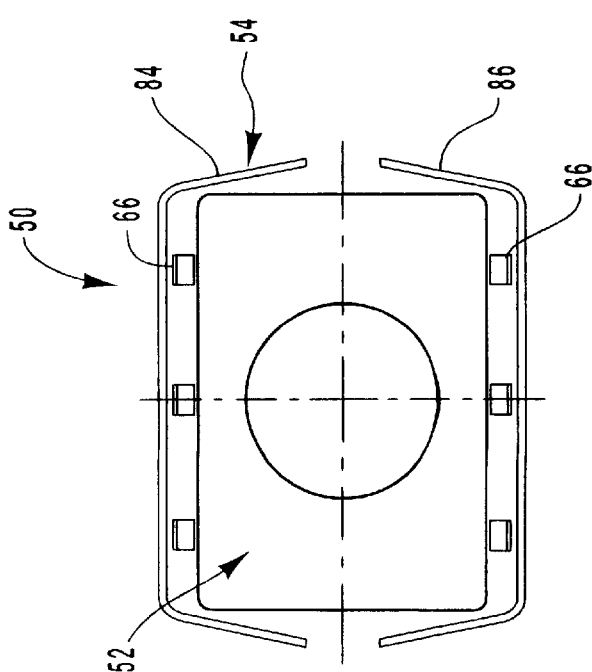
Figure 7:
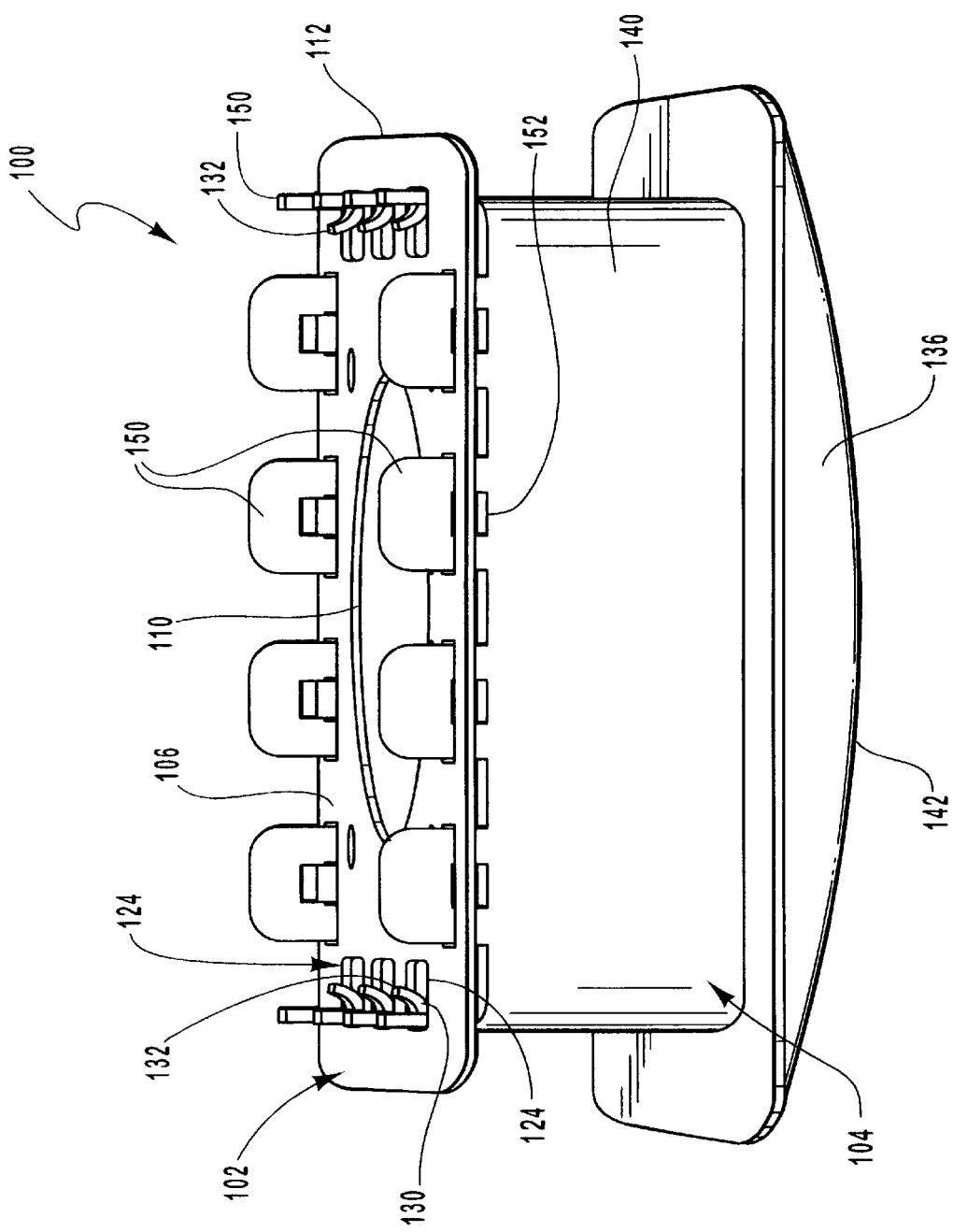
FIG. 7 is a perspective view of a simplified airbag module assembly having a cover and a housing member attached in an arrangement in accordance with a first embodiment of the invention.
Figure 10:
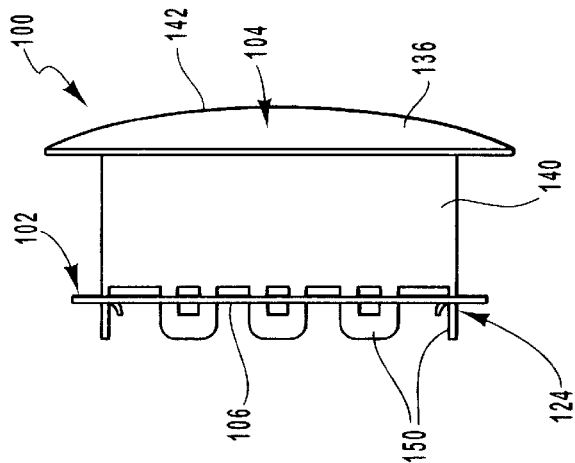
FIGS. 8–10 are bottom, side and end views, respectively, of the simplified airbag module assembly shown in FIG. 7.

The present invention, as is described in more detail below, provides an improved attachment arrangement for securing a decorative cover to or within an inflatable occupant restraint airbag module assembly. More particularly, the invention provides an improved such cover attachment arrangement that desirably provides positive cover retention attachment throughout the deployment process without requiring the addition, inclusion or use of one or more of the following features:

1) various secondary components, such as rivets or other fasteners or the like;
2) various secondary operations, such as crimping or the like; and
3) relatively intricate or complicated shapes or forms.

The invention is described below with particular reference to a driver side inflatable airbag module assembly such as for mounting to a steering wheel for automotive vehicles including vans, pick-up trucks, and particularly automobiles. Those skilled in the art will recognize that the invention also has applicability not only with other types or kinds of vehicles including, for example, airplanes, but also can, if desired, be applied to assemblies typically mounted in other locations. For example, the invention can be applied to passenger side airbag module assemblies such as normally or typically mounted in or closely behind the vehicle instrument panel or dashboard.

Turning now to FIGS. 7–10, there is illustrated an airbag module assembly, generally designated by the reference numeral 100. FIGS. 11–14 are enlarged detail views of selected portions of the airbag module assembly 100. As will be appreciated, the airbag module assembly 100 shown in FIGS. 7–10 has been simplified by not showing typical or usual module assembly features such as an inflator, airbag cushion and associated connection or retention devices or features such as are well known in the art. Such typical or usual module assembly features generally do not form a part of the invention or a limitation on the practice thereof.

The airbag module assembly 100 generally includes a reaction housing member 102 and a cover 104. Such housing member and cover can be constructed of various materials such as are known in the art and thus such materials of construction do not normally form a limitation on the broader practice of the invention. For example, the cover can be made of various thermoplastic materials such as are known in the art. As described in greater detail below, however, the invention can facilitate the use of housing members formed of relatively low cost steel stampings and thus in accordance with certain preferred embodiments of the invention, the use of such stamped housing members is preferred.

Figure 8:
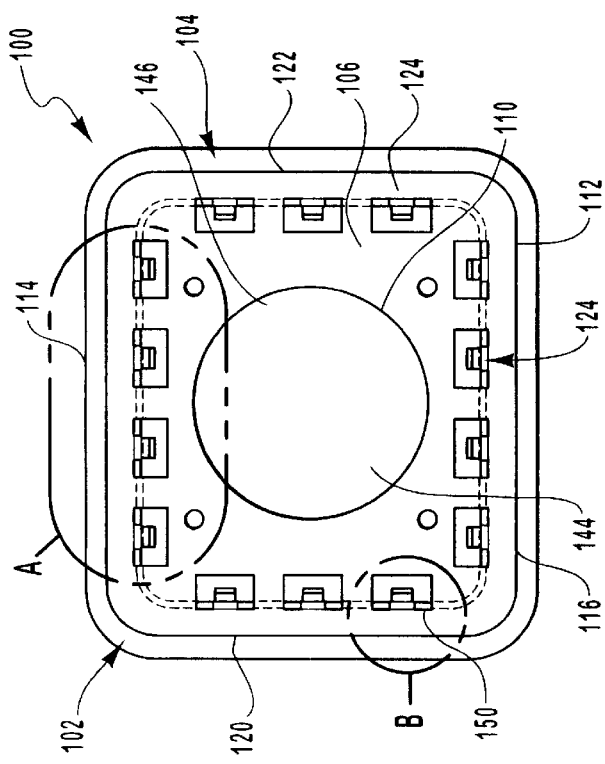
Figure 9:
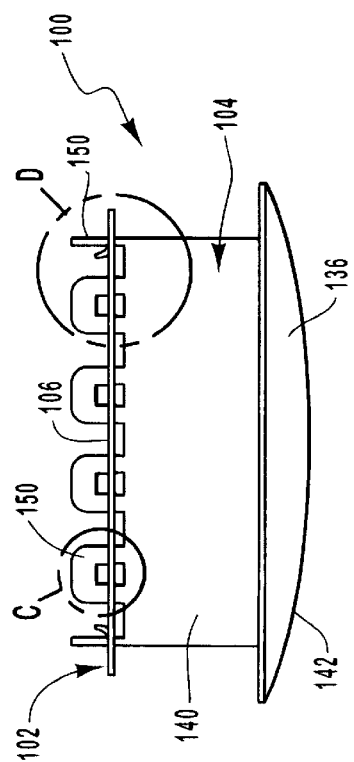
Figure 13:
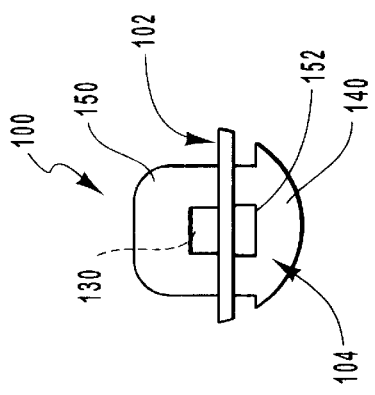
FIGS. 13 and 14 are enlarged detail fragmentary views of the airbag module assembly shown in FIGS. 7–10 encircled within the circles C and D, respectively, of FIG. 9.

The housing member 102 is adapted or suited, as is known in the art, to be secured to a structural element of a vehicle, such as the steering wheel or column in the case of a driver side inflatable restraint module assembly installation. The housing member 102 is generally in the shape or form of a plate. In particular, the housing member 102 includes a generally or substantially flat plate portion 106. The housing member 102 forms or includes an opening 110 such as adapted for securing an inflator device (not shown) therein. The housing member 102 and particularly the substantially flat plate portion 106 thereof have a generally rectangular shape, outline or periphery 112 when viewed from the bottom, as shown in FIG. 8. In particular, the housing member 102 has opposed first and second longitudinal sides 114 and 116, respectively, and opposed first and second lateral sides 120 and 122, respectively.

Figure 14:
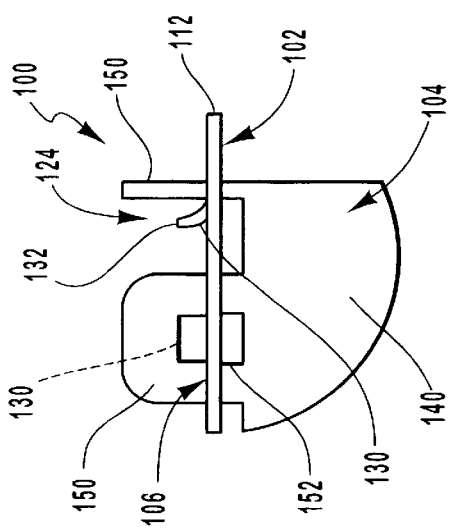
Figure 11:
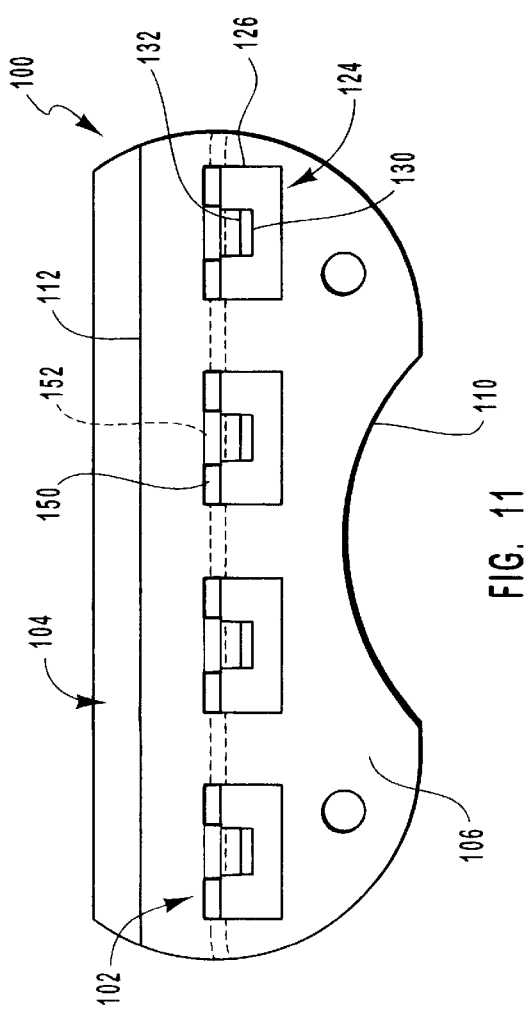
FIGS. 11 and 12 are enlarged detail fragmentary views of the airbag module assembly shown in FIGS. 7–10 encircled within the circles A and B, respectively, of FIG. 8.
Figure 12:
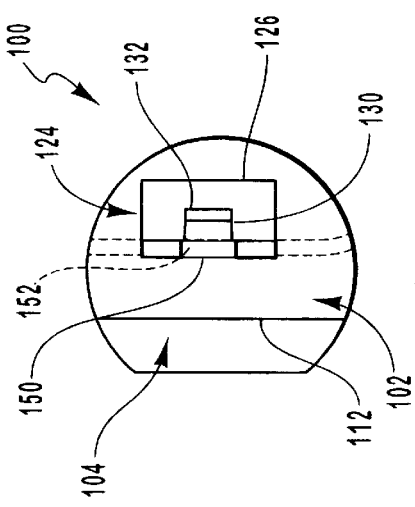

The housing member 102 additionally includes a plurality of mounting features, generally designated by the reference numeral 124, in accordance with one embodiment of the invention, spaced about the housing member longitudinal sides 114 and 116 and the lateral sides 120 and 122. As shown in greater detail in FIGS. 7, 11 and 12 each of the mounting features 124 includes a receiving hole 126 and at least one mounting projection 130. As shown in FIGS. 11, 12 and 14, the mounting projections 130 each have a free end 132 which is directed inward with respect to the housing member periphery 112.

Mounting projections employed in the practice of the invention can be variously sized and shaped. For example, suitable mounting projections for use in the practice of the invention may be in the shape or form of a straight "L" bend, a radius or an angle.

Returning to FIGS. 7, 9 and 10, the cover 104 includes a main panel 136 and a skirt 140 extending from the main panel 136. The cover panel 136 has an outer face 142 which opposes the passenger and which typically forms a flush surface with or on the cabin element of the vehicle interior on which the assembly 100 is placed. In accordance with the broader practice of the invention, such cabin element may take various forms, such as a steering wheel, seat, door, roof or instrument panel. Thus, such outer face will typically be a decorative face.

The cover panel 136 also includes an inner face 144 (shown in FIG. 8) opposite to the outer face 142. The skirt 140 extends from the inner face 144. The skirt 140 is located and sized so that the cover 104 and the housing member 102, when connected, serve to cooperate to form a storage volume 146. In practice, such storage volume is commonly employed to contain or house at least in part either or both the associated inflatable airbag cushion and inflator device. For example, the associated inflatable airbag cushion can be stored within such volume in a folded condition. Further, the associated inflator device may extend through the opening 110 and into the storage volume 146 such as to be in inflation medium communication with the airbag cushion, upon actuation.

The cover 104 includes a plurality of spaced apart first or cover tabs 150 extending from the skirt 140. As shown in greater detail in FIGS. 11–14, the tabs 150 each include at least one mounting opening 152. Each of the mounting openings 152 is adapted to receive an associated one of the mounting projections 130. While the mounting openings 152 in the cover 104 are shown as present in the tabs 150 extending from the cover skirt 140, it will be appreciated that in accordance with alternative embodiments of the invention, such mounting openings can, for example, be positioned or placed directly in or on a cover skirt, if desired.

While the invention has been described above relative to an airbag module assembly embodiment employing cover attachment mounting features spaced about both the longitudinal and lateral sides, respectively, of a rectangularly shaped reaction housing member, the broader practice of the invention is not necessarily so limited. In particular, the cover attachment arrangement of the invention can be employed at one or more selected points or sides of an assembly, as may be desired. For example, in certain preferred embodiments and as described in greater detail below, airbag module assemblies may desirably employ cover attachment mounting features on only either the opposed longitudinal or the opposed lateral sides of such a reaction housing member.

Further, while the invention has been described above relative to embodiments wherein each mounting feature includes a single receiving hole and a single mounting projection and for each mounting feature there is associated a cover tab having a single mounting opening, the broader practice of the invention is not necessarily so limited. As will be appreciated by those skilled in the art and guided by the teachings herein provided, various combinations and modifications are possible and herein encompassed. For example, mounting features can employ two or more mounting projections in association with a single receiving hole, if desired.

FIGS. 15–18 illustrate a housing member reaction plate 160 in accordance with an alternative embodiment of the invention. The reaction plate 160 has a horizontal axis and a vertical axis, designated by the reference numerals 162 and 164, respectively, shown in FIG. 15. The reaction plate 160 is generally planar is form and includes a planar portion 165 with an inner-facing planar face 166 and an outer-facing planar face 170, where "inner-facing" and "outer-facing" generally refer to the placement of such face when such housing member reaction plate and associated cover are joined to form a corresponding module assembly. The reaction plate 160 further has a generally rectangular shape, outline or periphery 171 when viewed from the bottom, as shown in FIG. 15

The reaction plate 160 may additionally include, if desired, one or more shoulder portions 172 such as generally perpendicular to the planar housing member reaction plate portion 165. As will be appreciated by those skilled in the art, such shoulder portions 172 may, if included, desirably serve to increase the rigidity or strength of the reaction plate 160 or the corresponding module assembly. Thus, the inclusion of such shoulder portions may assist the reaction plate and corresponding module assembly in resisting deformation without significantly or detrimentally enlarging the envelope required for installation of such an assembly within a vehicle.

The housing member reaction plate 160 forms or includes a central enlarged opening 174 (shown in FIG. 15) wherethrough an inflator device (not shown) can be passed through for connection or joiner into the corresponding module assembly. Surrounding the central enlarged opening 174 are a plurality of smaller first and second attachment openings 176 and 180, respectively, such as may be used, in a manner known in the art, for attachment of the inflator device and airbag cushion in the completed module assembly and for attachment or fastening of the module assembly to an associated structural component of the vehicle.

The housing member reaction plate 160, similar to the housing member 102 described above, includes first and second opposed longitudinal sides 182 and 184, respectively, and first and second opposed lateral sides 186 and 190, respectively. A plurality of mounting features, designated by the reference numeral 192 and such as described above are spaced about the housing member longitudinal sides 182 and 184 and the lateral sides 186 and 190. The mounting features 192 each includes a receiving hole 194 and at least one mounting projection 196. The mounting projections 196 each have a free end 200 which is directed inward with respect to the housing member periphery 171.

The mounting features 192 and/or the mounting projections 196 on one or more of the sides of the housing member may be equally spaced from the corresponding axis, as is the general case with respect to the mounting features 192 and the mounting projections 196 along the longitudinal sides 182 and 184 relative to the horizontal axis 162. Alternatively or in addition, the mounting features 192 and/or the mounting projections 196 on one or more of the sides of the housing member may be unequally spaced from the corresponding axis, as is the general case with respect to the mounting projections 192 and the mounting projections 196 along the lateral sides 186 and 190 relative to the vertical axis 164. As will be appreciated, the inclusion or use of such unequally or irregularly spaced mounting projections may be desired or helpful for various purposes including, for example, providing or resulting in specifically shaped module assemblies such as may be desired for particular module installations such as specifically shaped steering wheel installations, for example.

Figure 19:
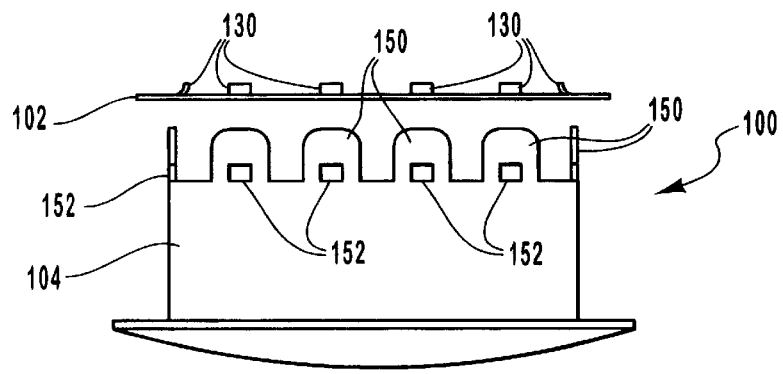
Figure 20:
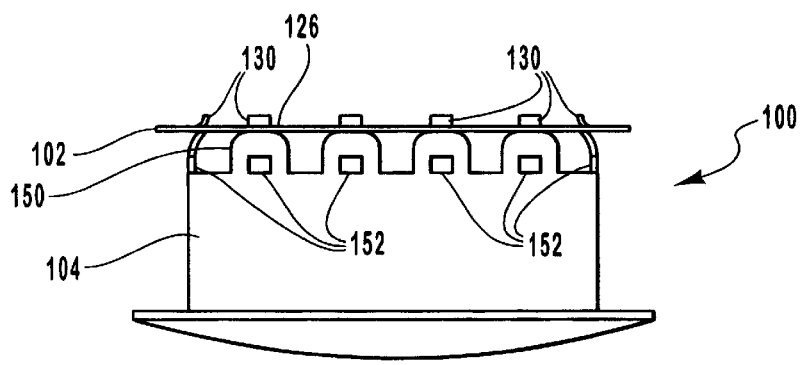
FIGS. 20–22 are side views which sequentially illustrate attachment of that cover and housing member in accordance with one embodiment of the invention.
Figure 21:
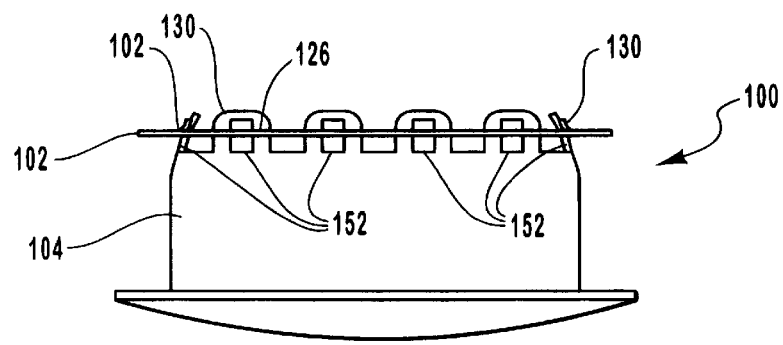
Figure 22:
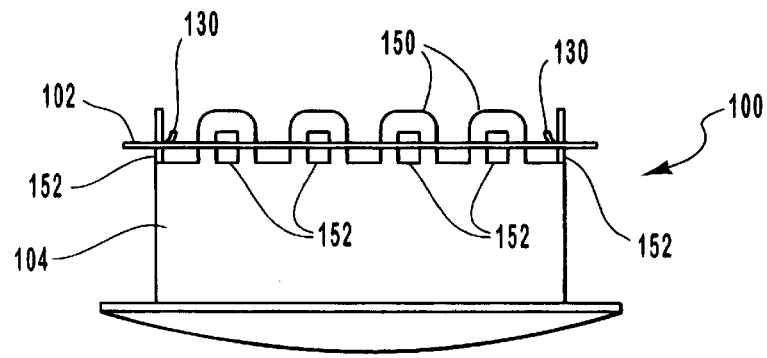

The airbag module assembly 100 and particularly the attachment of the housing member 102 and the cover 104 will be described in further detail making reference to FIGS. 19–22. First, the housing member 102 and the cover 104 are properly positioned, such as shown in FIG. 19. Then, as shown in FIG. 20, the cover tabs 150 are engaged with associated receiving holes 126 in the reaction housing 102. The engaged cover tabs 150 are each accepted within an associated receiving hole 126, as shown in FIG. 21. If needed or desired, a tool assist may be employed to facilitate either or both such cover tab engagement and acceptance. With such acceptance, the mounting projections 130 are each passed into the mounting opening 152 of the associated cover tab 150, such as to result in the final completed assembly 100, as shown in FIG. 22.

As will be appreciated, the final completed assembly 100 desirably forms or includes an interlocking joinder of the cover tabs 150 in associated housing member receiving holes 126 and housing member mounting projections 150 in associated cover mounting openings 152 such as may desirably serve to avoid detachment of the cover 104 from the housing member 102 upon deployment of the airbag cushion.

Figure 23:
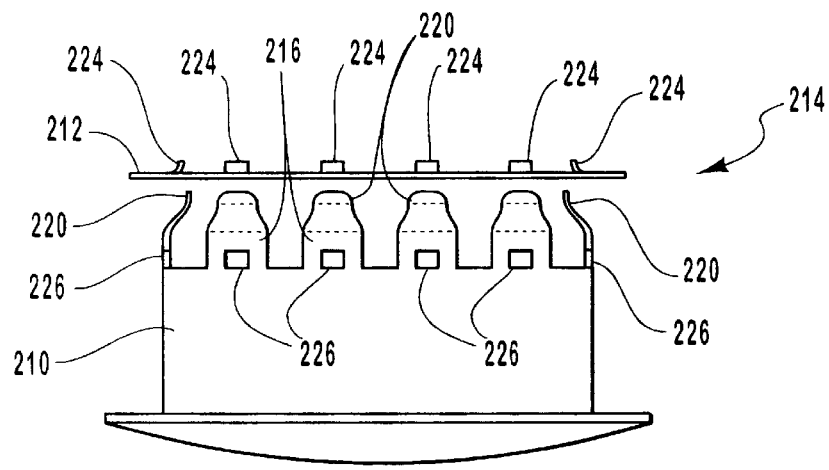
Figure 24:
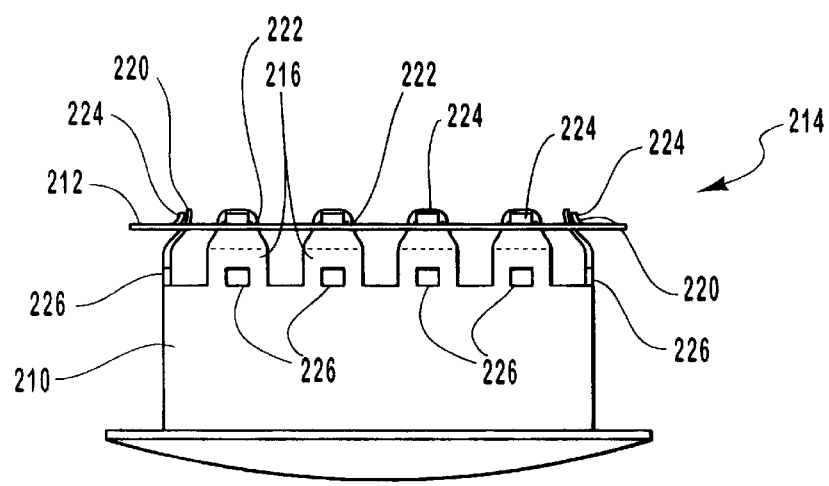
FIGS. 24 and 25 are side views which sequentially illustrate attachment of that cover and housing member in accordance with one embodiment of the invention.
Figure 25:
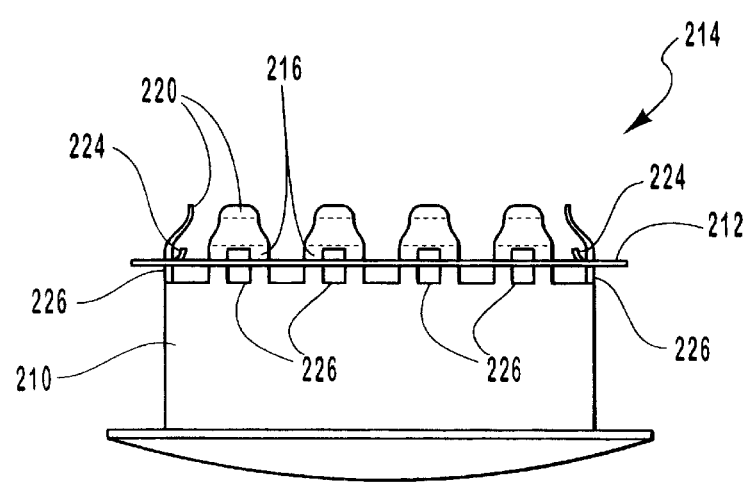

FIGS. 23–25 are side views which sequentially illustrate interlocking joinder attachment of a cover 210 and a housing member 212 in an airbag module assembly 214, in accordance with another preferred embodiment of the invention. More specifically, while the housing member 212 is generally the same as the housing member 102 used above, the cover 210 is different from the cover 104 used above in that the cover 210 includes tabs 216 which include a lead edge 220 which is tapered and angled or otherwise adapted such as to facilitate the press-on assembly with or relative to the associated housing member 212. For example and as shown, such tab lead edges 220 can desirably be angled inwardly, i.e., towards the center of the cover 210.

The attachment of the cover 210 and the housing member 212 in the airbag module assembly 214 generally involves properly positioning the cover 210 and the housing member 214, such as shown in FIG. 23. Then, as shown in FIG. 24, the lead edge 220 of each of the cover tabs 216 is engaged with an associated receiving hole 222 in the reaction housing member 212. The engaged cover tabs 216 are each accepted within an associated receiving hole 222, with a projection 224 associated with the receiving hole 222 passed into an associated mounting opening 226 in the cover tab 216 to form the final completed assembly 214, as shown in FIG. 25.

In such embodiment, angled mounting projections can be helpful in working in association with such cover tabs to facilitate the press-on assembly of the cover with or relative to the associated housing member such as by facilitating the simultaneous entry of multiple, preferably each, of such cover tabs into an associated respective housing member receiving hole. As will be appreciated, the presence or inclusion of tapered and angled lead edges 220 or the like on the cover tabs can facilitate the passage of such cover tabs in the receiving holes of the associated housing member and in turn facilitate the press-on assembly of such a cover with an associated housing member.

In particular, once the cover tabs and housing member receiving holes are properly aligned, the housing member can simply be pressed down onto the cover. The tapered and angled cover tabs are forced to deflect inward until the mounting opening in each of the cover tabs is aligned with the corresponding housing member mounting projection. Upon passage of the mounting projection into the associated cover tab mounting opening, the cover skirt wall will return to its normal or at rest standing position. In this position, the tapered and angled cover tabs can at least partially overhang the associated housing member receiving hole such as to provide some measure of protection against foreign objects undesirably entering the module assembly through such receiving hole.

Figure 26:
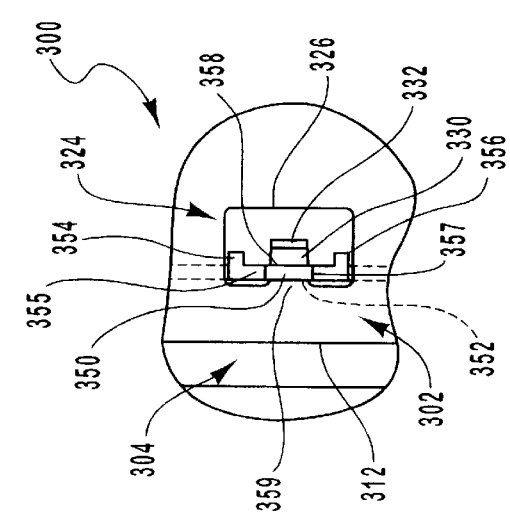
FIG. 26 is a detailed fragmentary view, similar to that shown in FIG. 12, of a cover and housing member attachment arrangement in accordance with an alternative embodiment of the invention.

Turning now to FIG. 26, there is illustrated a detailed view of a module assembly attachment arrangement, generally designated by the reference numeral 300, in accordance with an alternative embodiment of the invention. The module assembly attachment arrangement 300, similar to the module assembly 100 shown in FIG. 12, includes a housing member 302 and a cover 304. The housing member 302 has a periphery 312, similar to the housing member periphery 112 described above or the like.

The housing member 302 includes mounting features (one of which is shown in FIG. 26), generally designated by the reference numeral 324. The mounting features 324 are generally similar to the mounting features 124 described above in that the mounting features 324 each include a receiving hole 326 and at least one mounting projection 330 having a free end 332 which is directed inward with respect to the housing member periphery 312.

The cover 304, similar to the cover 104 described above, includes a plurality of spaced apart first or cover tabs 350 (one of which is shown in FIG. 26). The cover tabs 350 each include at least one mounting opening 352 adapted to receive an associated one of the mounting projections 330.

The module assembly attachment arrangement 300 differs from the module assembly 100 described above, however, primarily in that the cover 304 includes, as a part of the cover tab 350, a first support rib 354 extending generally vertically along a first vertical side 355 the mounting opening 352 and a second support rib 356 extending generally vertically along a second vertical side 357 of the mounting opening 352.

As module covers normally or typically tear or fail through the weakest (e.g., the smallest cross sectional area thereof), the presence or inclusion of such support ribs can serve to improve or increase the strength of the associated cover without requiring that the cover tabs be made wider. In accordance with particular preferred embodiments of the invention, module covers in accordance with the invention can be made or include such support ribs in association with one, a selected number, or all of the cover tabs of a particular cover, as may be desired. Further, such support ribs may appear on either or both sides of a particular mounting opening. Still further, as the cover tab 350 shown in FIG. 26 has an inner side 358 and an outer side 359, such support ribs may appear on either such inner or outer side, as may be desired in particular module assemblies.

Figure 27:
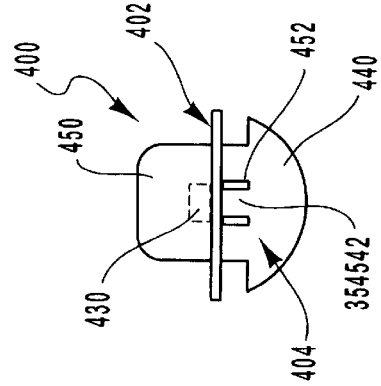
FIG. 27 is a detailed fragmentary view, similar to that shown in FIG. 13, of a cover and housing member attachment arrangement in accordance with another alternative embodiment of the invention.

Turning now to FIG. 27, there is illustrated a detailed view of a module assembly attachment arrangement, generally designated by the reference numeral 400, in accordance with an alternative embodiment of the invention. The module assembly attachment arrangement 400, similar to the module assembly 100 shown in FIG. 13, includes a housing member 402 and a cover 404.

The housing member 402 is generally similar to the housing member 102, described above, and includes a mounting projection 430.

The cover 404 is similar to the cover 104 described above in that the cover 404 includes a skirt 440 having a plurality of spaced apart first or cover tabs 450 (one of which is shown in FIG. 27) extending therefrom. The cover tabs 450, similar to the cover tabs 150 described above, each includes at least one mounting opening 452. Each of the mounting openings 452, similar to the mounting openings 152 described above, is adapted to receive an associated one of the mounting projections 430.

The module assembly attachment arrangement 400 differs from the module assembly 100 described above, however, primarily in that the cover 404 additionally comprises at least one locator finger 454, such as in the form of a flange or the like of the cover material. Such a locator finger extends into the mounting opening 452. As will be appreciated by those skilled in the art and guided by the teachings herein provided, through the inclusion and presence of the locator finger 454 within the mounting opening 452, movement of the associated mounting projection 430 within the mounting opening 452 can appropriately and desirably be limited or restricted such as to avoid or prevent undesired movement of the cover 404 relative to the housing member 402.

Figure 28:
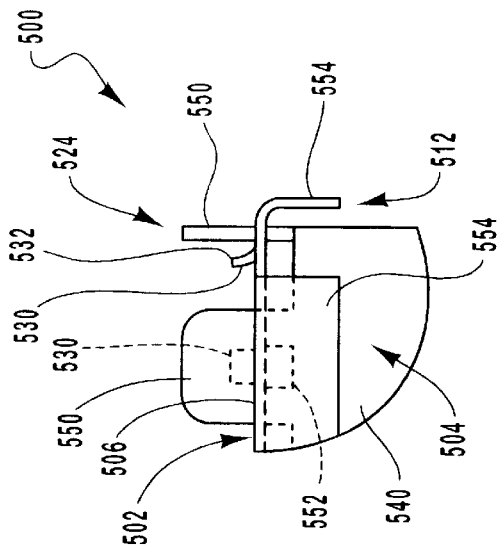
FIG. 28 is a detailed fragmentary view, similar to that shown in FIG. 14, of a cover and housing member attachment arrangement in accordance with yet another alternative embodiment of the invention.

Turning now to FIG. 28, there is illustrated a detailed view of a module assembly attachment arrangement, generally designated by the reference numeral 500, in accordance with an alternative embodiment of the invention. The module assembly attachment arrangement 500, similar to the module assembly 100 shown in FIG. 14, includes a housing member 502 and a cover 504.

The housing member 502, similar to the housing member 102 shown in FIG. 14, includes a generally or substantially flat plate portion 506 such as having or defining an outline or periphery 512. As will be appreciated, such outline or periphery 512, similar to the periphery 112 of the housing member 102 described above, may have or assume a rectangular or other desired shape or form.

The housing member 502, similar to the housing member 102, described above, includes a plurality of mounting features 524. The mounting features 524, similar to the mounting features 124, described above, includes at least one mounting projection 530 and the mounting projections 530 each have a free end 532 which is directed inward with respect to the housing member periphery 512.

The cover 504 is similar to the cover 104 described above in that the cover 504 includes a skirt 540 having a plurality of spaced apart first or cover tabs 550 extending therefrom. The cover tabs 550, similar to the cover tabs 150 described above, each include at least one mounting opening 552. Each of the mounting openings 552, similar to the mounting openings 152 described above, is adapted to receive an associated one of the mounting projections 530.

The module assembly attachment arrangement 500, however, primarily differs from the module assembly 100 in that the module assembly attachment arrangement 500 includes a standing wall 554 outboard one or more of the mounting openings 552 and, in the assembly, the associated mounting projection 530. In the illustrated embodiment, such standing wall 554 is formed integral (i.e., in one piece) as a part of the housing member 502.

The presence or assembly inclusion of such a standing wall outboard of a mounting opening and associated mounting projection can provide protection against foreign objects undesirably entering the module assembly through the open area of an exposed cover tab mounting opening. In addition or alternatively, such standing wall can assist the assembly or the components thereof in withstanding the hoop stresses developed or associated with the deployment of the associated airbag cushion. In particular, the inclusion of such a standing wall as a part of the housing member can desirably serve to strengthen such housing member against the forces which may be exerted thereon during use.

Figure 29:
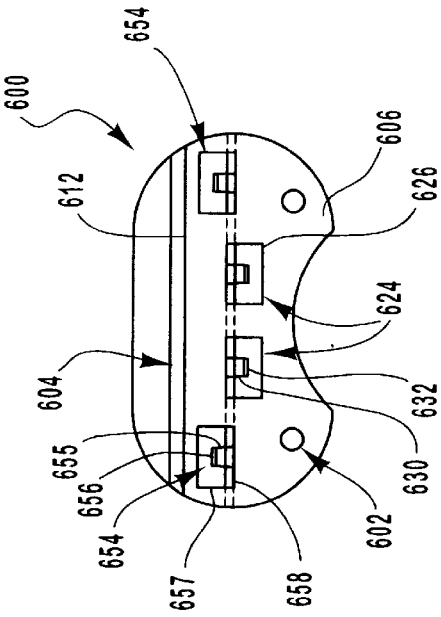
FIG. 29 is a detailed fragmentary view, similar to that shown in FIG. 11, of a cover and housing member attachment arrangement in accordance with yet still another alternative embodiment of the invention.

Turning now to FIG. 29, there is illustrated a detailed view of a module assembly attachment arrangement, generally designated by the reference numeral 600, in accordance with an alternative embodiment of the invention. The module assembly attachment arrangement 600, similar to the module assembly 100 shown in FIG. 11, includes a housing member and a cover, herein designated by the reference numerals 602 and 604, respectively.

The housing member 602, similar to the housing member 102 shown in FIG. 11, includes a generally or substantially flat plate portion 606 such as having or defining an outline or periphery 612. As will be appreciated such outline or periphery 612, similar to the periphery 112 of the housing member 102 described above, may have or assume a rectangular or other desired shape or form.

The housing member 602 includes a plurality of first mounting features 624, generally similar to the mounting features 124 of the housing member 102, described above. More particularly, the mounting features 624, similar to the mounting features 124, each include a receiving hole 626 and at least one mounting projection 630 having a free end 632 which is directed inward with respect to the housing member periphery 612.

The housing member 602, however, differs from the housing member 102, in that the housing member 602 additionally comprises one or more second mounting features 654 such as includes at least one second mounting projection 655 having free end 656 which is directed outward with respect to or towards the housing member periphery 612. As shown, such second mounting features 654 may also include an associated receiving hole 657 such as adapted to receive a second mounting tab 658 from the cover 604. Alternatively, or in addition, one or more second mounting features without an associated receiving hole may, if desired, be used.

The inclusion and use of both such first and second mounting features with associated inward and outward directed mounting projections in a particular airbag module assembly cover attachment arrangement can be particularly helpful in better ensuring avoidance of detachment of the cover from the housing member upon deployment of the associated airbag cushion, even when such attachment arrangement is used in association with "clamshell covers" or the like and such as may usually or typically form two or more separate or complimentary cover pieces or elements upon opening.

Particular beneficial aspects of at least certain of the above-described arrangements for attaching a cover with a housing member will now be described making reference to FIGS. 30–36. It is initially noted that FIGS. 30–36 generally correspond to FIGS. 1–6 described above but now employing an airbag module assembly in accordance with one embodiment of the invention such as described above and here designated by the reference numeral 700.

More particularly, FIG. 30 is a fragmentary bottom view of the module assembly 700 of a complimentary sized and shaped reaction housing 702 and a cover 704. As shown, the reaction housing 702 is generally rectangular in shape, having a periphery 705 with opposed first and second longitudinal sides 706 and 710 and opposed first and second lateral sides 712 and 714. The reaction housing 702 includes a plurality of mounting features 716, such as described above, on or along the first and second longitudinal sides 706 and 710, respectively. The mounting features 716 each include a receiving hole 720 and at least one mounting projection 722 having a free end 724 which is directed inward with respect to the housing member periphery 705 thereat.

As shown in FIG. 31, the cover 704 includes a main panel 725 and a skirt 726 extending therefrom. The cover main panel 725 forms or includes a brim 730, exterior to the skirt 726. Note that the view shown in FIG. 30 is fragmentary in nature as, for example, the cover brim 730 has not there been shown in an effort to facilitate illustration and comprehension.

The cover 704 includes a plurality of spaced apart first or cover tabs 732 extending from the skirt 726. The tabs 732 each include at least one mounting opening 734. Each of the mounting openings 734 is adapted to receive an associated one of the mounting projections 722 such as to form an interlocking joinder, such as described above, of the housing member 702 with or to the cover 704.

While FIG. 30 shows the inclusion of a circular opening 736 in the reaction housing 702 for the placement of an associated inflator device and FIG. 31 includes airbag cushion deployment direction arrows 740 to illustrate the typical deployment directions which an associated airbag cushion will deploy and exert forces onto the assembly, FIGS. 30 and 31 have been simplified by not showing the associated inflator, airbag cushion and associated connection or retention devices or features.

Figure 33:
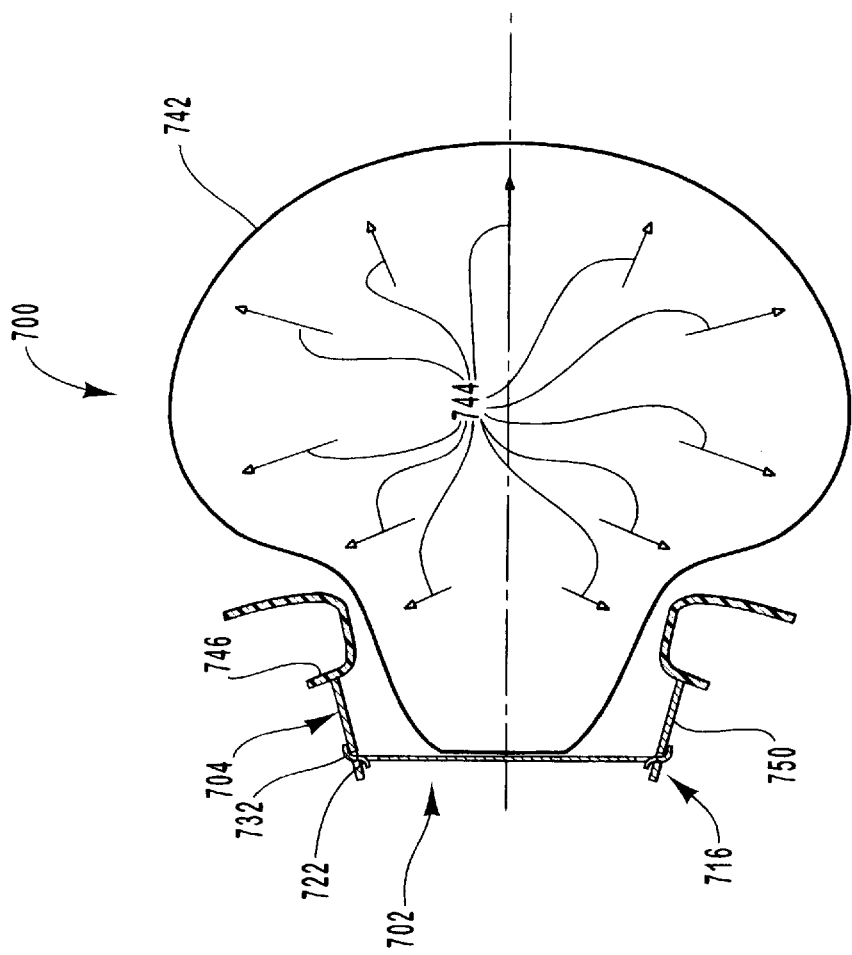
FIGS. 32 and 33 are simplified fragmentary bottom and side views, respectively, of the airbag module assembly shown in FIGS. 30 and 31 but now upon actuation with the associated airbag cushion being deployed therefrom.
Figure 32:
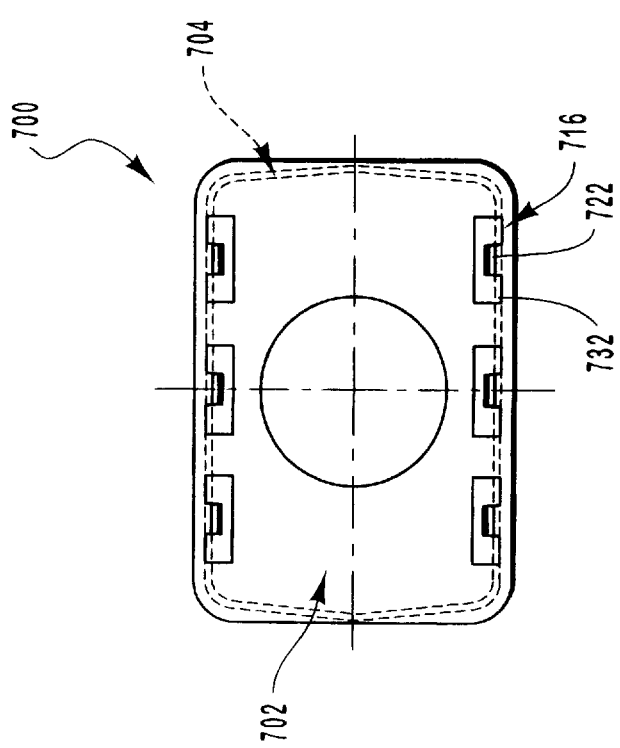

FIGS. 32 and 33 illustrate the module assembly 700 upon actuation and deployment of the associated airbag cushion 742 (shown in FIG. 33 and which FIG. 33 also includes direction arrows 744 illustrating typical or usual direction inflation medium forces upon the airbag cushion 742). As shown in FIGS. 32 and 33, and in accordance with a preferred embodiment of the invention, upon actuation of the module assembly 700, the airbag cushion 742 acts against the cover 704 resulting in the tearing or otherwise opening thereof such as to form first and second cover sections, 746 and 750, respectively, and to permit the airbag cushion 742 to deploy out of the assembly into desired position. The mounting features 716 and, in particular, the associated mounting projection 722 and cover tab 732 interact to retain the cover 704 joined to the housing 702 upon deployment of the associated airbag cushion 742.

Figure 35:
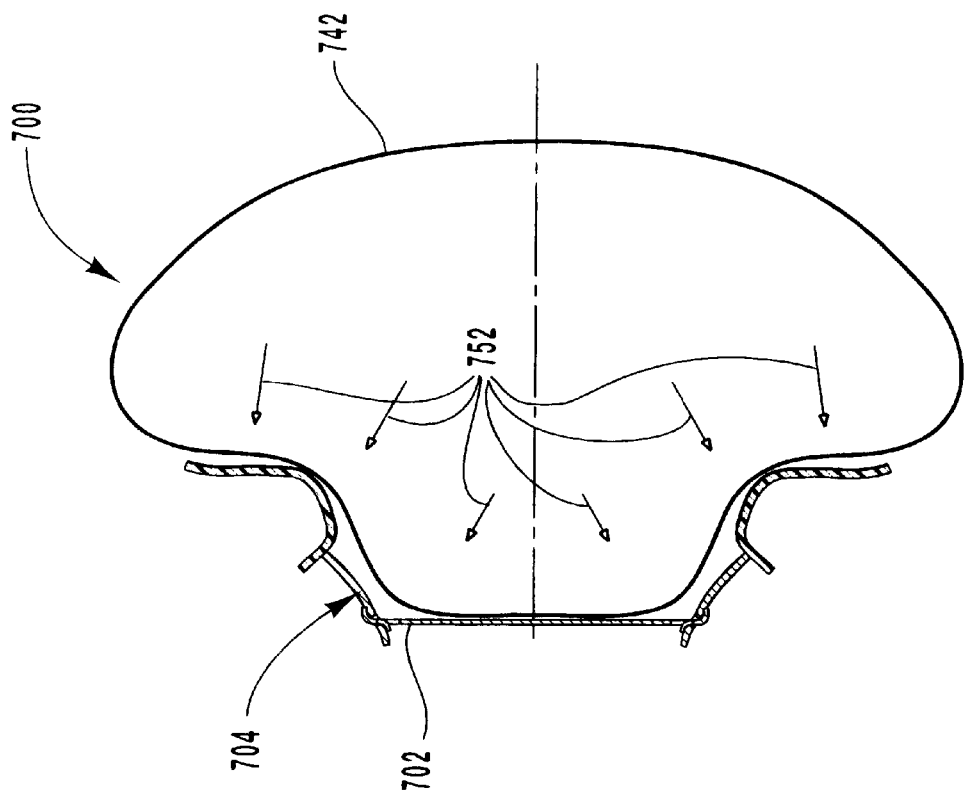
FIGS. 34 and 35 are simplified fragmentary bottom and side views, respectively, of the airbag module assembly shown in FIGS. 32 and 33 but now at a later time subsequent to actuation and showing the airbag cushion rebounding against the housing member.
Figure 34:
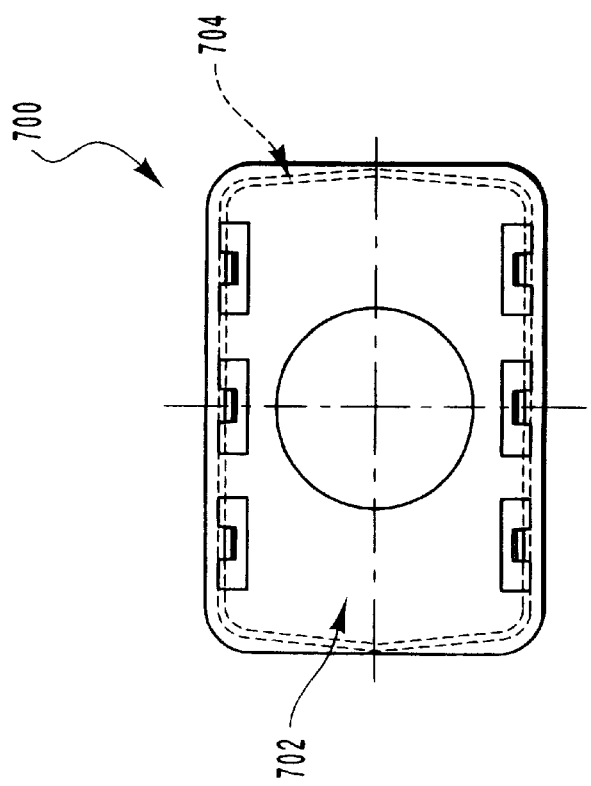

FIGS. 34 and 35 illustrate the further development of the deployment of the module assembly 700. In particular, FIGS. 34 and 35 illustrate that dislodgement or disengagement of the cover 704 from the housing member 702 is avoided or prevented even though the deployed airbag cushion 742 may push or rebound against the respective cover 704, as signified by the arrows 752 in FIG. 35.

It is to be understood that in the case of the employment of a clamshell cover, such as normally or commonly forms two separate complementary cover half pieces upon opening, it may be desirable to employ an attachment arrangement such as described above in relation to FIG. 29 which employs a combination of one or more mounting features having an inward directed mounting projection and one or more mounting features having an outward directed mounting projection in order to more fully ensure that the cover remains attached even upon rebound of the associated cushion.

While various embodiments and features of the invention have been described above in isolation of other such features and embodiments, it is to be understood that the broader practice of the invention is not necessarily so limited. For example, two or more of features such as angled and/or tapered cover tab lead edges (such as described above relative to the module assembly 214 shown in FIGS. 23–25); cover inclusion of one or more support ribs with one or more of the mounting openings (such as described above relative to the module assembly attachment arrangement 300 shown in FIG. 26); cover inclusion of one or more locator fingers (such as described above relative to the module assembly attachment arrangement 400 shown in FIG. 27); module assembly inclusion of an outboard standing wall (such as described above relative to the module assembly attachment arrangement 500 shown in FIG. 28); and module assembly inclusion of both inward and outward directed mounting projections (such as described above relative to the module assembly attachment arrangement 600 shown in FIG. 29) can be employed in various combinations such as may be desired to provide a cover attachment arrangement suited for the particular requirements of particular module installations.

For example, one particularly preferred combination for use when the module assembly employs a cover element which remains in one piece upon opening, is for the cover to include: 1) angled and/or tapered cover tab lead edges; 2) one or more support ribs with one or more, preferably with each, of the mounting openings and 3) one or more locator fingers and for the module assembly to also include an outboard standing wall, such as formed in one piece as a part of the housing member.

In the event of a module assembly which employs a cover, such as a clamshell cover and such as forms at least first and second separate pieces upon opening, the housing member may desirably additionally comprise at least one second mounting projection having an outward directed free end and the cover additionally comprise at least one second mounting opening for receiving the at least one second mounting projection such as to better ensure that each of the first and second cover pieces are individually retained by the housing member.

The invention, as described above, generally provides a relatively simple arrangement for attaching a cover with a housing member in an airbag module assembly. As described above, the interlocking cover attachment arrangement of the invention provides or results in positive cover retention by the housing member or in the module assembly throughout the deployment process. In particular, the invention generally provides a positive cover retention attachment arrangement throughout the deployment process without requiring the addition, inclusion or use of one or more of the following features:

1) various secondary components, such as rivets or other fasteners or the like;
2) various secondary operations, such as crimping or the like; and
3) relatively intricate or complicated shapes or forms.

Thus, the invention more easily permits or allows the use of reaction plate housing members formed of a simple, low-cost steel stamping, as compared to current stamped or extruded housings. Further, the cover attachment arrangement of the invention, utilizing inward mounting projections, can serve to employ the hoop stresses on the cover upon deployment to create a more positive cover attachment. Still further, the covers employed in association with the attachment arrangements of the invention can employ a less costly design of simple standing walls without requiring complicated or costly undercuts or particular design features. In addition, the cover attachment arrangement of the invention requires no special tooling or assembly processing. Also, assembly reworking, if desired or required, can be accomplished in a relatively simple manner with resulting component scrapping typically being at least reduced and generally eliminated.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an airbag module assembly wherein a cover and a housing member cooperate to define a storage volume for at least in part housing a stored inflatable airbag cushion, an arrangement for attaching the cover with the housing member which arrangement is effective to avoid detachment of the cover from the housing member upon deployment of the airbag cushion, the arrangement comprising:
   the housing member including a plurality of inwardly directed first mounting projections, each of the first mounting projections having an inward directed free end; and
   the cover including a plurality of first mounting openings each receiving an associated one of the first mounting projections therethrough, wherein the free end of each of the first mounting projections extends in a direction away from the stored inflatable airbag cushion.

2. The cover attachment arrangement of claim 1 wherein the cover includes a main panel, a skirt extending from the main panel and a plurality of first tabs extending from the skirt with each first tab including at least one of the first mounting openings.

3. The cover attachment arrangement of claim 2 wherein the housing member additionally includes a plurality of receiving holes, each receiving hole including at least one of the plurality of first mounting projections, each receiving hole sized and adapted to receive a number of the first tabs corresponding to the number of first mounting projections associated with the respective receiving hole.

4. The cover attachment arrangement of claim 3 wherein at least one of the first tabs includes a lead edge adapted for press-on assembly relative to an associated receiving hole.

5. The cover attachment arrangement of claim 1 wherein:
   the housing member additionally comprises at least one second mounting projection having an outward directed free end and
   the cover additionally comprises at least one second mounting opening for receiving the at least one second mounting projection.

6. The cover attachment arrangement of claim 5 wherein the cover is adapted to open to permit the inflatable airbag cushion to deploy therethrough and wherein upon opening, the cover forms at least first and second separate pieces with each of the first and second cover pieces individually retained by the housing member.

7. The cover attachment arrangement of claim 1 additionally comprising at least one standing wall outboard of at least one of the first mounting openings.

8. The cover attachment arrangement of claim 7 wherein the at least one standing wall is formed integrally with the housing member.

9. The cover attachment arrangement of claim 7 comprising a standing wall outboard of each of the plurality of the first mounting openings.

10. The cover attachment arrangement of claim 1 wherein the airbag module is a driver side airbag module.

11. The cover attachment arrangement of claim 1 wherein the first mounting projections are individually spaced about the periphery of the housing member.

12. The cover attachment arrangement of claim 1 wherein the housing member comprises a substantially flat plate portion including an opening adapted for securing an inflator device therethrough in inflating communication with the inflatable airbag cushion housed at least in part within the chamber.

13. The cover attachment arrangement of claim 1 wherein the housing member includes a planar portion having an opening adapted to receive an inflator device and wherein the planar portion also includes the plurality of inwardly directed first mounting projections.

14. In an airbag module assembly wherein a cover and a housing member cooperate to define a storage volume for at least in part housing a stored inflatable airbag cushion, an arrangement for attaching the cover with the housing member which arrangement is effective to avoid detachment of the cover from the housing member upon deployment of the airbag cushion, the arrangement comprising:
   the housing member including a plurality of first mounting projections, each of the first mounting projections having an inward directed free end; and
   wherein the cover includes a main panel, a skirt extending from the main panel and a plurality of first tabs extending from the skirt, the cover including a plurality of first mounting openings each receiving an associated one of the first mounting projections with each first tab including at least one of the first mounting openings, wherein the free end of each of the first mounting projections extends in a direction away from the stored inflatable airbag cushion and wherein at least one of the first tabs includes at least one support rib.

15. The cover attachment arrangement of claim 14 wherein the at least one support rib extends vertically along one vertical side of one of the first mounting openings.

16. The cover attachment arrangement of claim 15 wherein the cover skirt defines an inner side and an outer side wherein the at least one support rib is on the inner side of the cover skirt.

17. The cover attachment arrangement of claim 15 wherein a first support rib extends vertically along a first vertical side of one of the first mounting openings and a second support rib extends vertically along a second vertical side of the same one of first mounting openings.

18. A cover attachment arrangement for an airbag module, comprising:

a housing member constructed and arranged to be secured to a structural element of a vehicle, the housing member including a plurality of receiving holes, each of the receiving holes including at least one first mounting projection having an inward directed free end; and a cover including a main panel, a skirt extending from the main panel, and a plurality of first tabs extending from the skirt, wherein each tab is adapted to be received in at least one of the housing member receiving holes and wherein at least one of the first tabs includes at least one mounting opening adapted to receive an associated one of the first mounting projections, wherein at least one of the first tabs includes a lead edge adapted for press-on assembly relative to the housing member, wherein at least one of the first tabs includes at least one support rib and wherein the cover additionally comprises at least one locator finger extending into the at least one mounting opening of the at least one of the first tabs, the locator finger adapted to cooperate with the associated one of the first mounting projections to restrict movement thereof within the at least one mounting opening;

the housing member and the cover cooperating to define a chamber adapted to at least in part house an inflatable airbag cushion with the free end of each of the first mounting projections extending in a direction away from the chamber.

19. The cover attachment arrangement of claim 18 wherein the cover tab lead edge adapted for press-on assembly relative to the housing member is tapered and angled.

20. In an airbag module assembly wherein a cover and a housing member cooperate to define a storage volume for at least in part housing a stored inflatable airbag cushion, an arrangement for attaching the cover with the housing member which arrangement is effective to avoid detachment of the cover from the housing member upon deployment of the airbag cushion, the arrangement comprising:

the housing member including a plurality of first mounting projections, each of the first mounting projections having an inward directed free end; and the cover including a plurality of first mounting openings each receiving an associated one of the first mounting projections, wherein the free end of each of the first mounting projections extends in a direction away from the stored inflatable airbag cushion, wherein the cover additionally comprises at least one locator finger extending into a first of the first mounting openings, the locator finger adapted to cooperate with the first mounting projection associated with the first of the first mounting openings to restrict movement of the associated first mounting projection within the first of the first mounting openings.

* * * * *